(12) United States Patent
Wilson et al.

(10) Patent No.: US 7,945,229 B2
(45) Date of Patent: May 17, 2011

(54) SOFTWARE-DEFINABLE RADIO TRANSCEIVER WITH MEMS FILTERS

(75) Inventors: Chad E. Wilson, Sammamish, WA (US); Jeffrey K. Hunter, Olathe, KS (US); Palaniappan Meiyappan, Bellevue, WA (US); E. F. Charles LaBerge, Towson, MD (US)

(73) Assignee: Honeywell International Inc., Morristown, NJ (US)

( * ) Notice: Subject to any disclaimer, the term of this patent is extended or adjusted under 35 U.S.C. 154(b) by 684 days.

(21) Appl. No.: 12/036,083

(22) Filed: Feb. 22, 2008

(65) Prior Publication Data
US 2008/0242239 A1    Oct. 2, 2008

Related U.S. Application Data

(60) Provisional application No. 60/909,679, filed on Apr. 2, 2007.

(51) Int. Cl.
*H04B 1/10*    (2006.01)
*H04B 1/44*    (2006.01)

(52) U.S. Cl. ............................. 455/296; 455/307; 455/83

(58) Field of Classification Search .................. 455/515, 455/552.1, 83, 78, 553.1, 299, 306, 307, 455/339, 213, 296, 63.1
See application file for complete search history.

(56) References Cited

U.S. PATENT DOCUMENTS

| | | | |
|---|---|---|---|
| 4,701,727 A | 10/1987 | Wong | |
| 5,864,754 A | 1/1999 | Hotto | |
| 6,072,994 A | 6/2000 | Phillips et al. | |
| 6,236,845 B1 | 5/2001 | Hotto | |
| 6,577,854 B2 | 6/2003 | Hotto | |
| 6,680,660 B2 | 1/2004 | Nguyen | |
| 7,043,219 B2 | 5/2006 | Hotto | |
| 7,187,735 B2 | 3/2007 | Kent, III et al. | |
| 2002/0130734 A1 | 9/2002 | Liang et al. | |
| 2003/0027534 A1 | 2/2003 | Swazey | |
| 2004/0052272 A1 | 3/2004 | Frank | |

(Continued)

FOREIGN PATENT DOCUMENTS

WO    9533350    12/1995

(Continued)

OTHER PUBLICATIONS

Brown, "RF-MEMS Switches for Reconfigurable Intergrated Circuits", "IEEE Transactions on Microwave Theory and Techniques", Nov. 1998, pp. 1868-1880, vol. 46, No. 11, Publisher: IEEE.

(Continued)

*Primary Examiner* — Eugene Yun
(74) *Attorney, Agent, or Firm* — Fogg & Powers LLC

(57) ABSTRACT

A transceiver apparatus comprising a software-definable-radio-transceiver architecture. The transceiver apparatus comprises at least one up-conversion path including at least one configurable micro-electro-mechanical-system (MEMS) transmit filter communicatively coupled to transmit output from a digital-to-analog converter to an antenna, and at least one down-conversion path including at least one configurable-MEMS-receive filter communicatively coupled to transmit signals received from the antenna to an analog-to-digital converter. The at least one configurable-MEMS-transmit filter prevents interference on the up-conversion path from signals transmitted from the antenna. The at least one configurable-MEMS-receive filter prevents interference on the down-conversion path from signals transmitted to the antenna. A plurality of upconversion and downconversion paths can operate simultaneously and on different channel frequencies.

20 Claims, 12 Drawing Sheets

U.S. PATENT DOCUMENTS

| | | | |
|---|---|---|---|
| 2004/0092243 | A1 | 5/2004 | Hey-Shipton |
| 2004/0095210 | A1 | 5/2004 | Nguyen |
| 2004/0137947 | A1 | 7/2004 | Nimmo-Smith |
| 2006/0052124 | A1* | 3/2006 | Pottenger et al. ............. 455/515 |
| 2006/0057959 | A1 | 3/2006 | Vacanti et al. |
| 2007/0207761 | A1 | 9/2007 | LaBerge et al. |

FOREIGN PATENT DOCUMENTS

| | | |
|---|---|---|
| WO | 03036876 | 5/2003 |
| WO | 2004098085 | 11/2004 |

OTHER PUBLICATIONS

Pucker, "Applicability of the JTRS Software Communication Architecture in Advanced Milsatcom Terminals", "2003 IEEE Military Communications Conference", Oct. 2003, pp. 533-537, vol. 2, Publisher: IEEE.

Ratazzi, "Microelectromechanical Devices for Multimode Communication Systems", "Proceedings of the IEEE 2000 National Areospace and Electronics Conference", Oct. 2000, pp. 346-353, Publisher: IEEE.

Mitola III , "Software Radios—Survey, Critical Evaluation and Future Directions", "NTC-92 National Telesystems Conference", May 19-20, 1992, Publisher: IEEE, Published in: New York, NY, USA.

Mitola III, "Software Radios—Survey, Critical Evaluations and Future Directions", "IEEE AES Systems Magazine", Apr. 1993, pp. 25-36, vol. 8, No. 4, Publisher: IEEE, Published in: Fairfax, VA, USA.

Mitola, "The Software Radio Architecture", "IEEE Communications Magazine", May 1995, pp. 26-38, vol. 33, No. 5, Publisher: IEEE, Published in: Bedford, MA, USA.

* cited by examiner

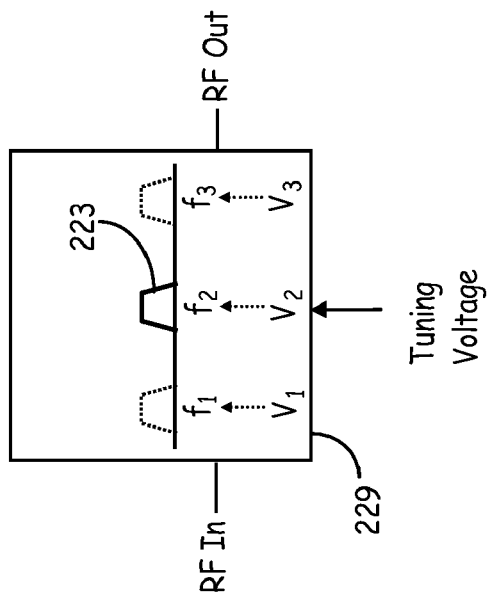
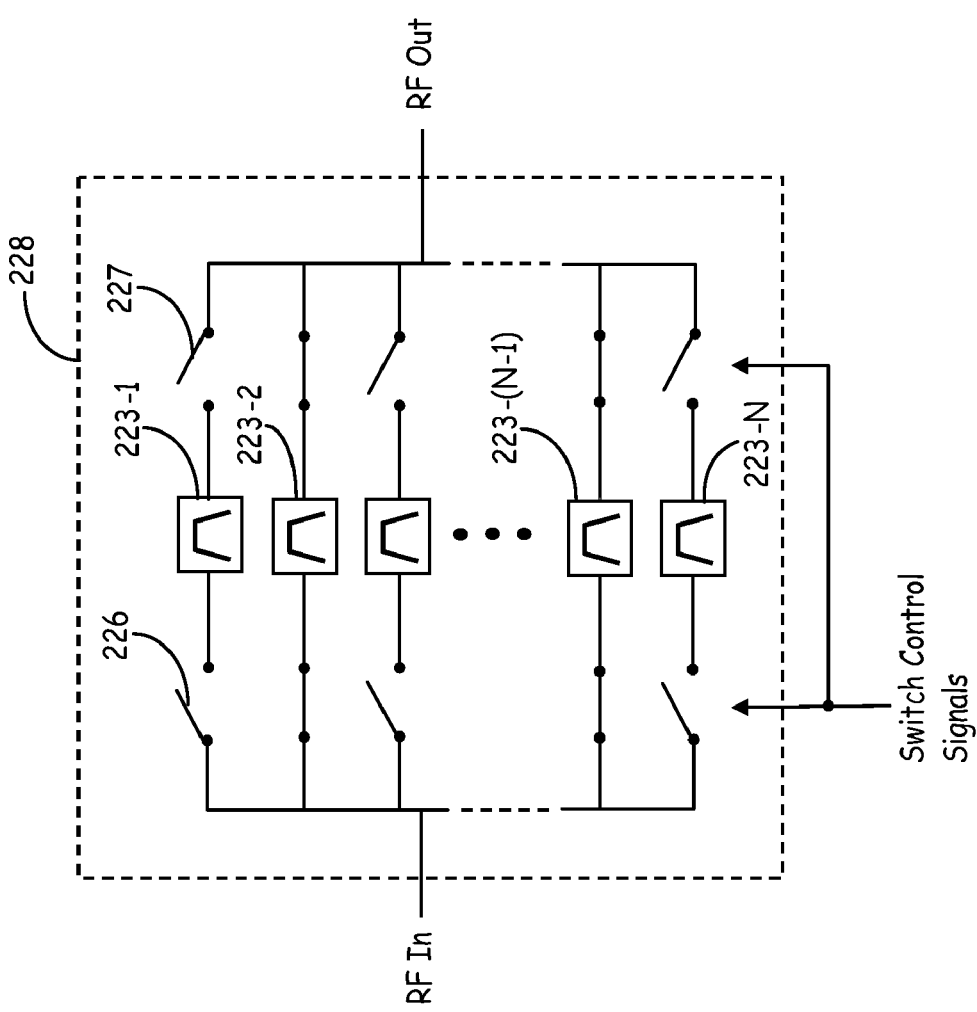
FIG. 3B
FIG. 3A

SOFTWARE-DEFINABLE RADIO TRANSCEIVER WITH MEMS FILTERS

This application claims the benefit of U.S. Provisional Application No. 60/909,679, filed on Apr. 2, 2007, which is incorporated herein by reference in its entirety.

CROSS REFERENCE TO RELATED APPLICATIONS

This application is related to U.S. patent applications Ser. No. 11/566,921 having a title of "MEMS BASED MULTI-BAND RECEIVER ARCHITECTURE" (also referred to here as the "'921 Application") and filed on Dec. 5, 2006.

This application is also related to U.S. Provisional Patent Applications Ser. No. 60/815,796 having a title of "METHOD AND APPARATUS FOR TRANSMITTING AND RECEIVING MULTIPLE RADIO SIGNALS THROUGH A SINGLE ANTENNA" (also referred to here as the "'796 Application") and filed on Jun. 22, 2006.

This application is also related to U.S. patent applications Ser. No. 10/938,482 having a title of "RADIO HAVING A MEMS PRESELECT FILTER" (also referred to here as the "'482 Application) and filed on Sep. 10, 2004.

This application is also related to U.S. patent applications Ser. No. 11/765,207 having a title of "APPARATUS AND METHOD FOR TRANSMITTING AND RECEIVING MULTIPLE RADIO SIGNALS OVER A SINGLE ANTENNA" (also referred to here as the "'207 Application) and filed on Jun. 19, 2007.

The '482 Application, the '921 application, the '796 application, and the '207 are incorporated herein by reference.

BACKGROUND

On commercial aircraft, there can be up to three very high frequency (VHF) communication radios which operate independently and simultaneously in multiple modes (with different modulation schemes) in the same designated aeronautical frequency band, such as 118-136.975 MHz. Often there is limited spatial separation between the antennae feeding the three VHF radios. The proximally located antennae are not isolated from each other. This lack of isolation between the antennae creates stringent requirements on the transmit side and the receive side of the transceivers in order to avoid interference from cross channel signals.

If there are spurious emissions and noise being transmitted from the transmitter end of the transceiver, the receive linearity and selectivity must be well controlled in order to prevent desensitization and to preserve the large dynamic range of the receiver. The speed and dynamic ranges of currently available Digital-to-Analog/Analog-to-Digital Converters (DAC/ADC) are not sufficient for direct digital up-conversion or down-conversion. Therefore, transceiver architectures are limited to complex, physically large, expensive, and power consuming technologies. Typically analog direct up conversion or heterodyne up-conversion/down-conversion technologies include filters, which are not the ideal for software-definable or cognitive radio systems.

SUMMARY

In one aspect, the present application discloses a transceiver apparatus comprising a software-definable-radio-transceiver architecture. The transceiver apparatus comprises an up-conversion path including at least one configurable micro-electro-mechanical-system (MEMS) transmit filter communicatively coupled to transmit output from a digital-to-analog converter to an antenna and a down-conversion path including at least one configurable-MEMS-receive filter communicatively coupled to signals received from the antenna to an analog-to-digital converter. The at least one configurable-MEMS-transmit filter prevents interference on the up-conversion path from signals transmitted from the antenna to the down-conversion path. The at least one configurable-MEMS-receive filter prevents interference on the down-conversion path from signals transmitted to the antenna from the up-conversion path.

DRAWINGS

FIGS. 3A and 3B are block diagrams illustrating a switched bank of MEMS filters and a tunable MEMS filter, respectively, in accordance with the present invention.

In accordance with common practice, the various described features are not drawn to scale but are drawn to emphasize features relevant to the present invention. Like reference characters denote like elements throughout figures and text.

DETAILED DESCRIPTION

The embodiments of the transceiver apparatuses described herein filter the transmitter noise and interference on the frequencies in which the transceiver apparatuses are not transmitting and/or the receiver noise and interference on the frequencies in which the transceiver apparatuses are not receiving while reducing the complexity of the transceiver apparatuses.

Figure 1:
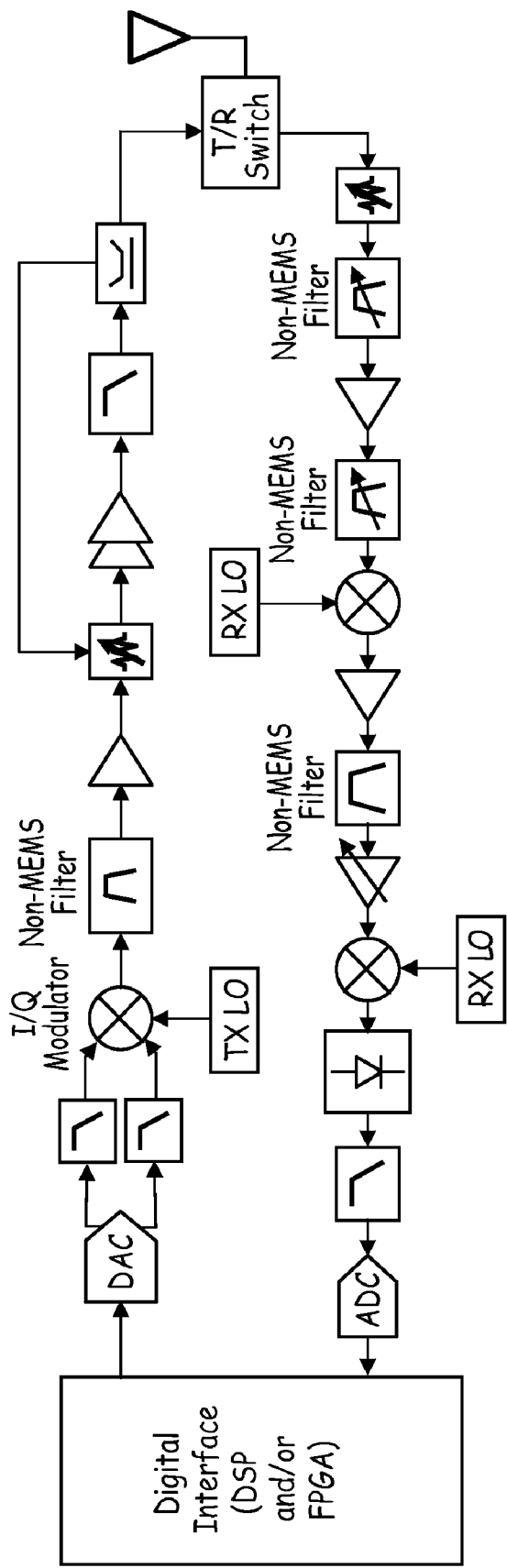
FIG. 1 is a block diagram of a prior art transceiver.

The embodiments of the transceiver apparatuses described herein have fewer components on the up-conversion path and the down-conversion paths than prior art transceivers. FIG. 1 is a block diagram of a prior art transceiver that includes non-MEMS-based filters.

In general, bandpass filters in the transmit chain or up-conversion path of a transceiver apparatus reduce general emissions and noise of the transmitter on frequencies that are not purposely being transmitted. Notch filters in the transmit chain or up-conversion path of a transceiver apparatus reduce transmitter noise on specific frequencies which other nearby transceiver receivers may be receiving.

Bandpass filters in the receive path or down-conversion path of a transceiver apparatus reduce the general interference and noise on frequencies in which the receiver is not operating. Notch filters in the receive path or down-conversion path of a transceiver apparatus eliminate particularly strong interference on specific frequencies which other nearby transceivers are transmitting. The nearby transceivers are defined herein as transceivers, which are part of the plurality of transceivers connected to the same antenna, and as transceivers connected to other nearby antennae.

Figure 2:
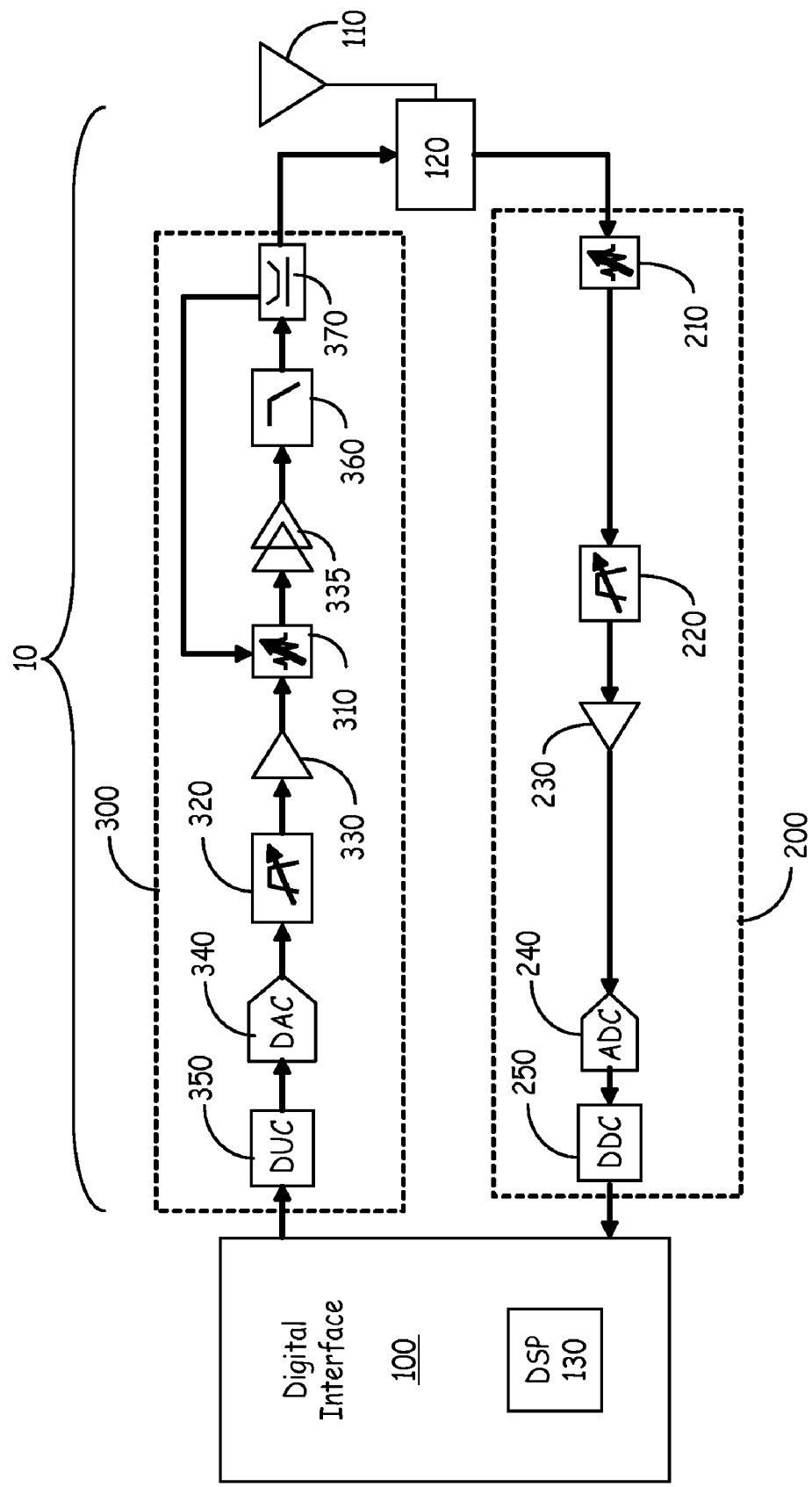
FIG. 2 is a block diagram of an embodiment of a transceiver apparatus in accordance with the present invention.

FIG. 2 is a block diagram of an embodiment of a transceiver apparatus 10 in accordance with the present invention. The transceiver apparatus 10 includes a software-definable-radio-transceiver architecture. The transceiver apparatus 10 includes a circulator 120, an up-conversion path 300 that feeds signals from a digital interface 100 to an antenna 110 via the circulator 120, and a down-conversion path 200 that sends signals received at the antenna 110 to the digital interface 100 via the circulator 120. The analog signals received at the antenna 110 are modified during transmission via the down-conversion path 200 and are received as digital signals at the digital interface 100. Likewise, digital signals sent from the digital interface 100 are modified during transmission via the up-conversion path 300 and are transmitted as analog signals at the antenna 110. The down-conversion path 200 is also referred to herein as the receive chain 200. The up-conversion path 300 is also referred to herein as the transmit chain 300.

In one implementation of this embodiment, the transceiver apparatus 10 includes the antenna 110. In another implementation of this embodiment, the transceiver apparatus 10 includes the digital interface 100. In yet another implementation of this embodiment, the circulator 120 is a transceiver switch 120.

At least one configurable-MEMS-transmit filter represented generally at 320 in the up-conversion path 300 prevents interference on the up-conversion path 300 from signals transmitted from the antenna 110. Likewise, at least one configurable-MEMS-receive filter represented generally at 220 in the down-conversion path 200 prevents interference on the down-conversion path 200 from signals received to the antenna 110.

The down-conversion path 200 includes the configurable-MEMS-receive filter 220, an analog-to-digital converter 240, and a digital down-converter 250. The configurable-MEMS-receive filter 220 is communicatively coupled to signals received from the antenna 110 to the analog-to-digital converter (ADC) 240. The analog-to-digital converter (ADC) 240 outputs signals to the communicatively coupled digital down-converter 250. The output side of the digital down-converter 250 is communicatively coupled to output signals to the digital interface 100. As shown in FIG. 2, a power attenuator 210 is positioned to receive the signals from the circulator 120 and to output signals to the configurable-MEMS-receive filter 220.

The up-conversion path 300 includes a digital up-converter 350, a digital-to-analog converter 340, and the configurable-MEMS-transmit filter 320. The digital up-converter 350 is communicatively coupled to receive signals from the digital interface 100 and to output signals to the digital-to-analog converter 340. The digital-to-analog converter 340 is communicatively coupled to output signals to the configurable-MEMS-transmit filter 320. The configurable-MEMS-transmit filter 320 outputs signals to the circulator 120 via an amplifier 330 and components in a feedback loop of the up-conversion path 300. The circulator 120 outputs signals from the up-conversion path 300 to the antenna 110.

The components in a feedback loop of the up-conversion path 300 include a power attenuator 310, a power amplifier 335, a low pass filter 360, and a coupler 370, which are positioned between the output of amplifier 330 and the circulator 120. The amplifier 330 receives filtered signals from the configurable-MEMS-transmit filter 320 and sends output signals to the power attenuator 310. The power attenuator 310 outputs signals to the power amplifier 335. The output from the power amplifier 335 is sent to the low pass filter 360, which transmits filtered signals to the coupler 370. The coupler 370 is communicatively coupled to feedback signals to the power attenuator 310. The coupler 370 is also communicatively coupled to output signals to the circulator 120.

The digital interface 100 includes a digital signal processor (DSP) 130. The digital signal processor is software definable so the transceiver apparatus 10 can be programmed to operate in one of many modulation and channel schemes. The digital signal processor can be reprogrammed with no hardware changes. The configurable, high-Q MEMS components in the configurable-MEMS-transmit filter 320 and the configurable-MEMS-receive filter 220 enable this flexibility by not "limiting" the bandwidth and/or channel selection while still providing adequate rejection of undesired frequencies. In one implementation of this embodiment, the digital interface 100 includes a field programmable gate array.

The transceiver apparatus 10 differs from prior art transceivers in that a conventional baseband section or synthesizer is not included in the transceiver apparatus 10. Thus, the transceiver apparatus 10 can have reduced complexity, size, cost and power consumption from that of the prior art transceivers.

In one implementation of this embodiment, the configurable-MEMS-transmit filter 320 includes a switched bank of MEMS filters that are adjustable to the transmit frequency. In another implementation of this embodiment, the configurable-MEMS-transmit filter 320 includes a tunable MEMS notch filter that is tunable to the receive frequency. In yet another implementation of this embodiment, the configurable-MEMS-transmit filter 320 includes combinations of tunable notch filters (such as non-MEMS notch filters), switched banks of MEMS filters, and tunable MEMS notch filters.

The transmit frequency differs from the receive frequency. In one implementation of this embodiment, the at least one configurable-MEMS-receive filter 220 comprises a switched bank of MEMS filters that are adjustable to the receive frequency. In another implementation of this embodiment, the at least one configurable-MEMS-receive filter 220 comprises a tunable MEMS notch filter that is tunable to the transmit frequency. In yet another implementation of this embodiment, the configurable-MEMS-receive filter 220 includes combinations of tunable notch filters (such as non-MEMS notch filters), switched banks of MEMS filters, and tunable MEMS notch filters.

FIGS. 3A and 3B are block diagrams illustrating a switched bank of MEMS filters 228 and a tunable MEMS filter 229, respectively, in accordance with the present invention. The tunable MEMS filter 229 is also referred to as a voltage-tunable MEMS filter 229. As shown in FIG. 3A, a plurality of MEMS band pass filters (BPF) 223-(1-N) are positioned between respective ones of an input switch represented generally at 226 and an output switch represented generally at 227. Switch control signals input to the switched bank of MEMS filters 228 provide signals to open and/or close selected pairs of input switches 226 and output switches 227 as required to transmit the desired frequency within the tunable bandwidth region. The input switches 226 and output switches 227 at the input and output of the MEMS band pass filters 223-2 and 223-(N-1) are closed in this exemplary configuration of FIG. 3A so that the signals within the frequency band transmitted by the band pass filters 223-2 and 223-(N-1) are transmitted from the switched bank of MEMS filters 228.

As shown in FIG. 3B, a tuning voltage input to the MEMS filter 229 is adjusted to pass a desired segment of the tunable bandwidth region. In the exemplary embodiment shown in FIG. 3B, the voltage is set at $V_2$ and the signals with a narrow band centered on the frequency $f_2$ are transmitted through the MEMS filter 229.

As shown in FIGS. 3A and 3B, the filter is a band pass filter with a pass response. In one implementation of this embodiment, the switched bank of MEMS filters 228 and a tunable MEMS filter 229 are not bandpass filters, but rather, include notch filters, which block a selected frequency band and pass the remainder of the frequencies.

When the bandpass filter is included in the transmit chain 300 or receive chain 200, it is tuned to and passes the transmit channel frequency or the receive channel frequency, respectively. When the notch (or band-stop) filter is included in the transmit chain 300, it is tuned to the receiver frequency in order to allow the transmit signal to pass as necessary and to prevent the noise that falls on receive channels from "escaping" to the receive chain. When a notch filter is in receive chain 200, it is tuned to the transmitter frequency in order to notch (or reduce/eliminate) the signal at transmit channel frequency and to pass the signal at receive channel frequency.

Figure 4A:
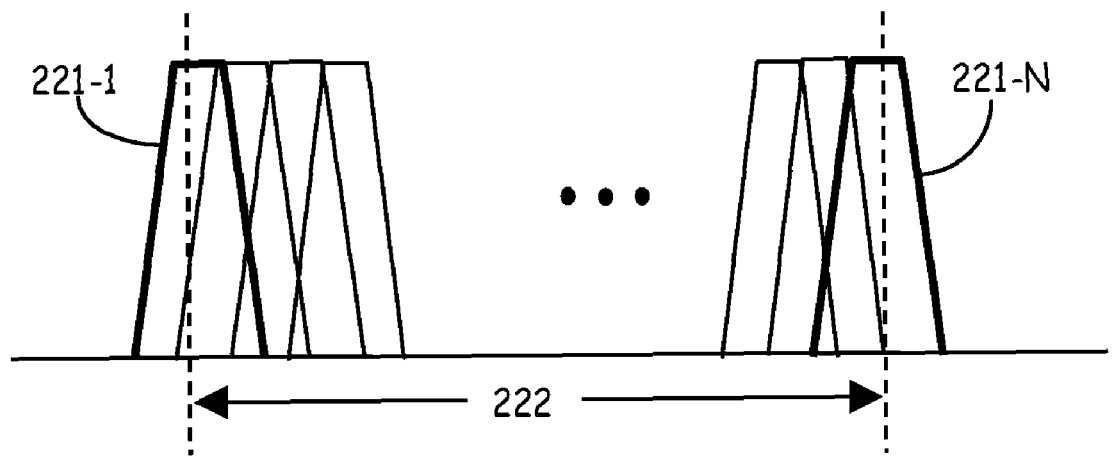
FIGS. 4A and 4B are frequency response representations of selectable bandwidth segments of an exemplary switched bank of MEMS and a tunable MEMS filter in accordance with the present invention.
Figure 4B:
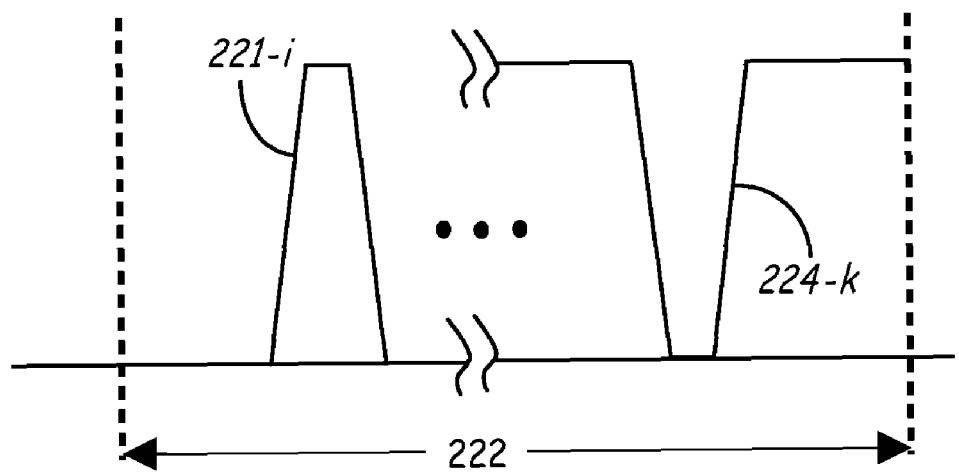

FIGS. 4A and 4B are diagrams illustrating the frequency response of selectable bandwidth segments 221-(1-N) (also referred to herein as channels 221-(1-N)) of an exemplary tunable MEMS filter 229 (FIG. 3B), for use in a configurable-MEMS-transmit filter 320 or a configurable-MEMS-receive filter 220 (FIG. 2), in accordance with the present invention. In FIG. 4A, the frequency range represented generally at 222 is shown to include a plurality of channels 221-1 to 221-N. The exemplary channels 221-1 and 221-N are shown in bold lines. A tunable MEMS filter 229 can be tuned to select any of the bandwidth segments in the range from 221-1 to 221-N. In one implementation of this embodiment, frequency range 222 extends from 118 MHz to 137 MHz. As shown in FIG. 4A, the bandwidth segments are passed by a bandpass tunable MEMS filter 229.

In one implementation of this embodiment, the configurable-MEMS-transmit filter 320 or the configurable-MEMS-receive filter 220 include a fixed-MEMS-notch filter that is set at the receive frequency or the transmit frequency, respectively. In FIG. 4B, a single selected bandwidth segment 221-$i$ is shown for a band pass filter and a single selected bandwidth segment 224-$k$ is shown for a notch filter. The frequency response of selectable bandwidth segments for notch filters (as represented by the single selected bandwidth segment 224-$k$) are inverted with respect to frequency response of selectable bandwidth segments for band pass filters (as indicated by the single selected bandwidth segment 221-$i$).

Figure 5A:
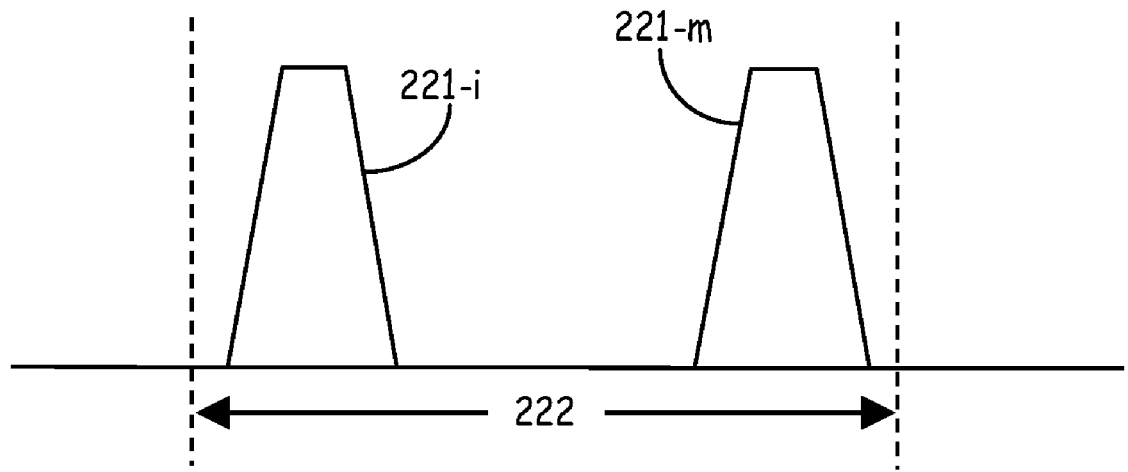
FIGS. 5A and 5B are schematic representations of selectable bandwidth segments selected by an exemplary switched bank of MEMS filters in accordance with the present invention.
Figure 5B:
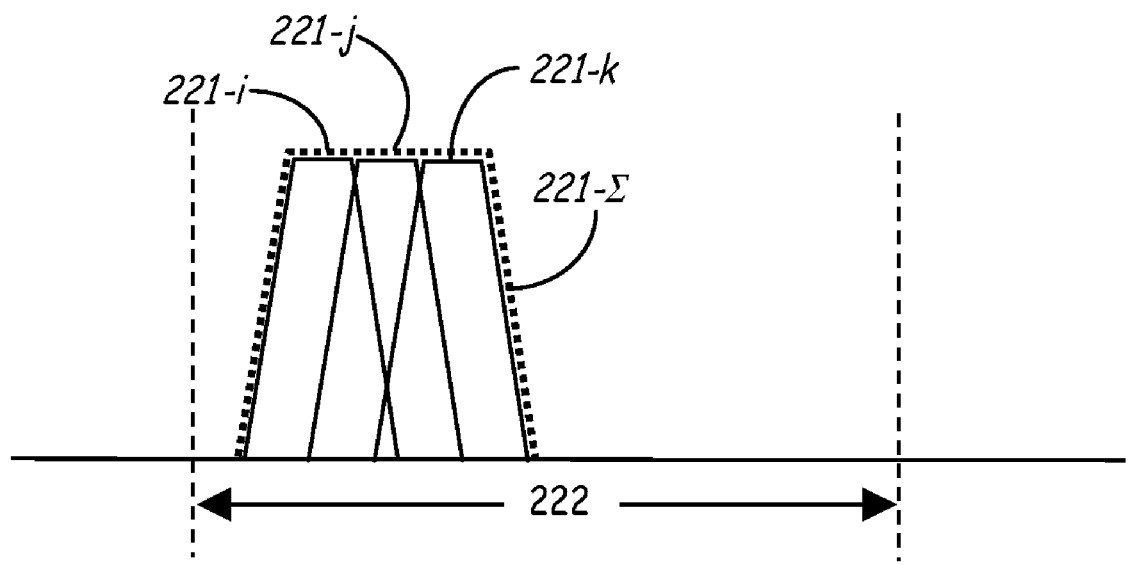

FIGS. 5A and 5B are diagrams illustrating the selectable bandwidth segments selected by an exemplary cascaded switched bank of MEMS filters 228 (FIG. 3A) or by an exemplary cascaded tunable MEMS filters 229 (FIG. 3B), for use in a configurable-MEMS-transmit filter 320 or a configurable-MEMS-receive filter 220, in accordance with the present invention. The cascaded MEMS filters can be used to select multiple paths of tunable filters so that one, two or more bandwidth segments are simultaneously transmitted. In FIG. 5A, two non-overlapping selected bandwidth segments 221-$i$ and 221-$m$ are shown. In FIG. 5B, three overlapping selected bandwidth segments 221-$i$, 221-$j$ and 221-$k$, are selected for transmission by the cascade of MEMS filters so that a wider bandwidth segment, represented generally by the dashed-line labeled as 221-$\Sigma$, of the tunable bandwidth region is transmitted by the switched bank of MEMS filters 228 or tunable MEMS filters 229. This permits the transceiver to adjust between narrow or wide bandwidths as instructed by software definition and control.

A tunable MEMS filter 229 or a switched bank of MEMS filters 228 in a radio frequency transceiver have a high quality (Q) factor in order to pass a narrow bandwidth 221 over a large range of frequencies 222 in both the transmit and receive stages. The MEMS filters 223 (FIGS. 3A and 3B) in the transceiver apparatus 10 permit the use of direct digital up-conversion and down-conversion with a minimal set of analog components.

The MEMS filters 223 provide enough frequency selectivity to transceive a plurality of very high frequency (VHF) channels 221-(1-N). Selected ones of the channels 221-(1-N) are integrable within the digital domain and are generated simultaneously by the transmit digital-to-analog converter in an up-conversion path. Selected others of the channels 221-(1-N) are sampled simultaneously by the receive analog-to-digital converter in a down-conversion path. In one implementation of this embodiment, the MEMS filters 223 provide enough frequency selectivity to transceive a plurality of high frequency (HF) channels.

FIGS. 6-12 are block diagrams of various embodiments of transceiver apparatuses 11-17, respectively, in accordance with the present invention. The transceiver apparatuses 11-17 in FIGS. 6-12, respectively, each implement a software-definable-radio-transceiver architecture. The transceiver apparatuses 11-17 each comprise at least one up-conversion path and at least one down-conversion path, which each communicatively couple an antenna to a digital interface.

Figure 6:
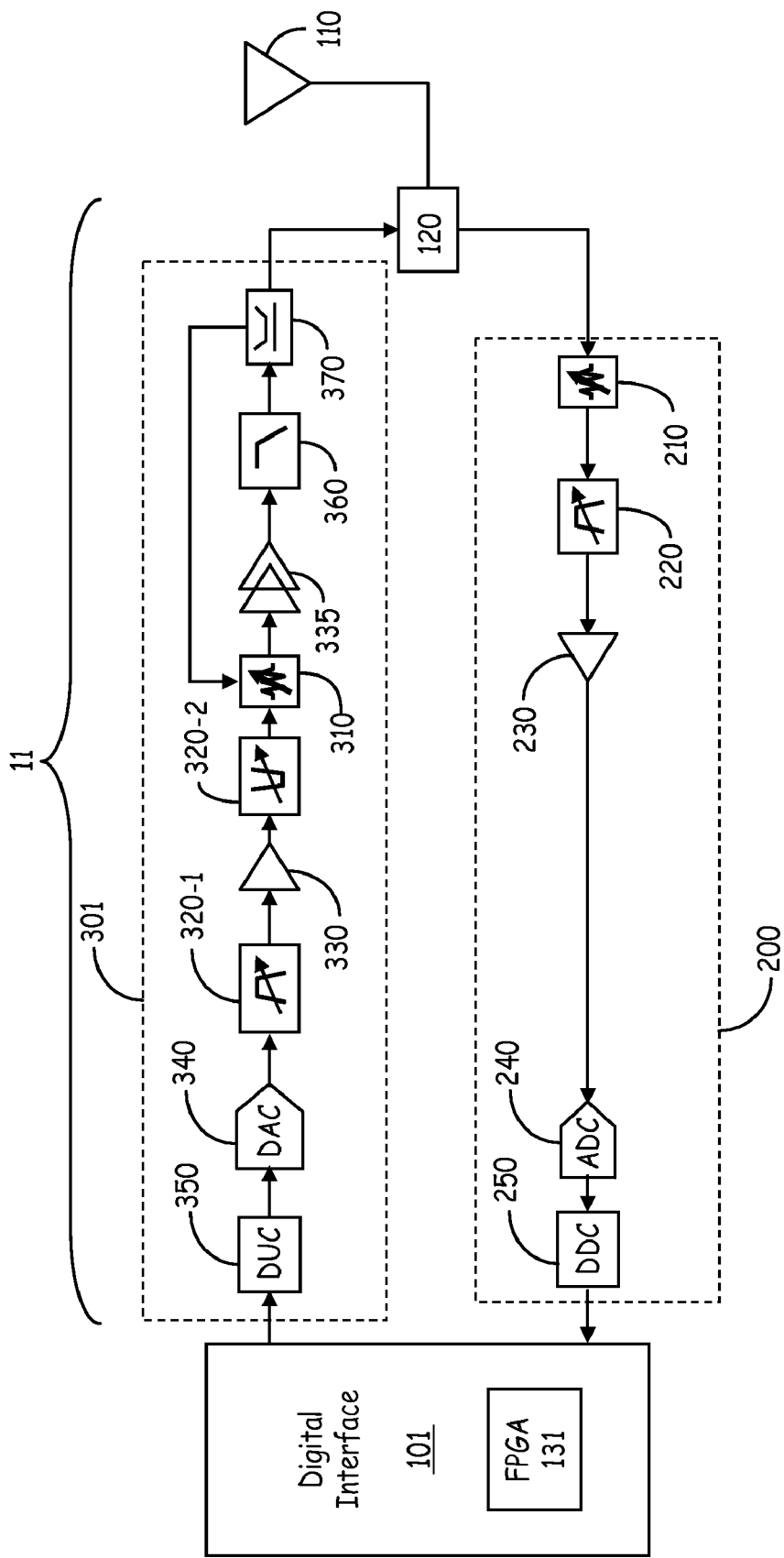
FIGS. 6-12 are block diagrams of various embodiments of transceiver apparatuses in accordance with the present invention.

As shown in FIG. 6, the transceiver apparatus 11 includes the down-conversion path 200, which is the same as the down-conversion path 200 in FIG. 2, and an up-conversion path 301. The up-conversion path 301 differs from the up-conversion path 300 in FIG. 2, in that the configurable-MEMS-transmit filter 320 in FIG. 2 is a first configurable-MEMS-transmit filter 320-1 and there is a second configurable-MEMS-transmit filter 320-2 positioned between the amplifier 330 and the power attenuator 310. The second configurable-MEMS-transmit filter 320-2 is similar in structure and function to the embodiments of the configurable-MEMS-transmit filter 320 described above with reference to FIG. 2 except that it has a notch or bandstop response. The transceiver apparatus 11 has the added advantage over the transceiver apparatus 10 in that there is additional filtering of the transmitter noise on the frequencies in which the downconverter 200 is operating.

The digital interface 101 is communicatively coupled to the down-conversion path 200 and the up-conversion path 301. The digital interface 101 includes a field programmable gate array (FPGA) 131. The field programmable gate array 131 is software definable so the transceiver apparatus 11 can be programmed to operate in one of many modulation and channel schemes. The field programmable gate array can be reprogrammed with no hardware changes. The configurable, high-Q MEMS in the configurable-MEMS-transmit filters 320-1 and 320-2 and the configurable-MEMS-receive filter 220, enable this flexibility by not "limiting" the bandwidth and/or channel selection while still providing adequate rejection of undesired frequencies. In one implementation of this embodiment, the digital interface 101 includes a digital signal processor.

Figure 7:
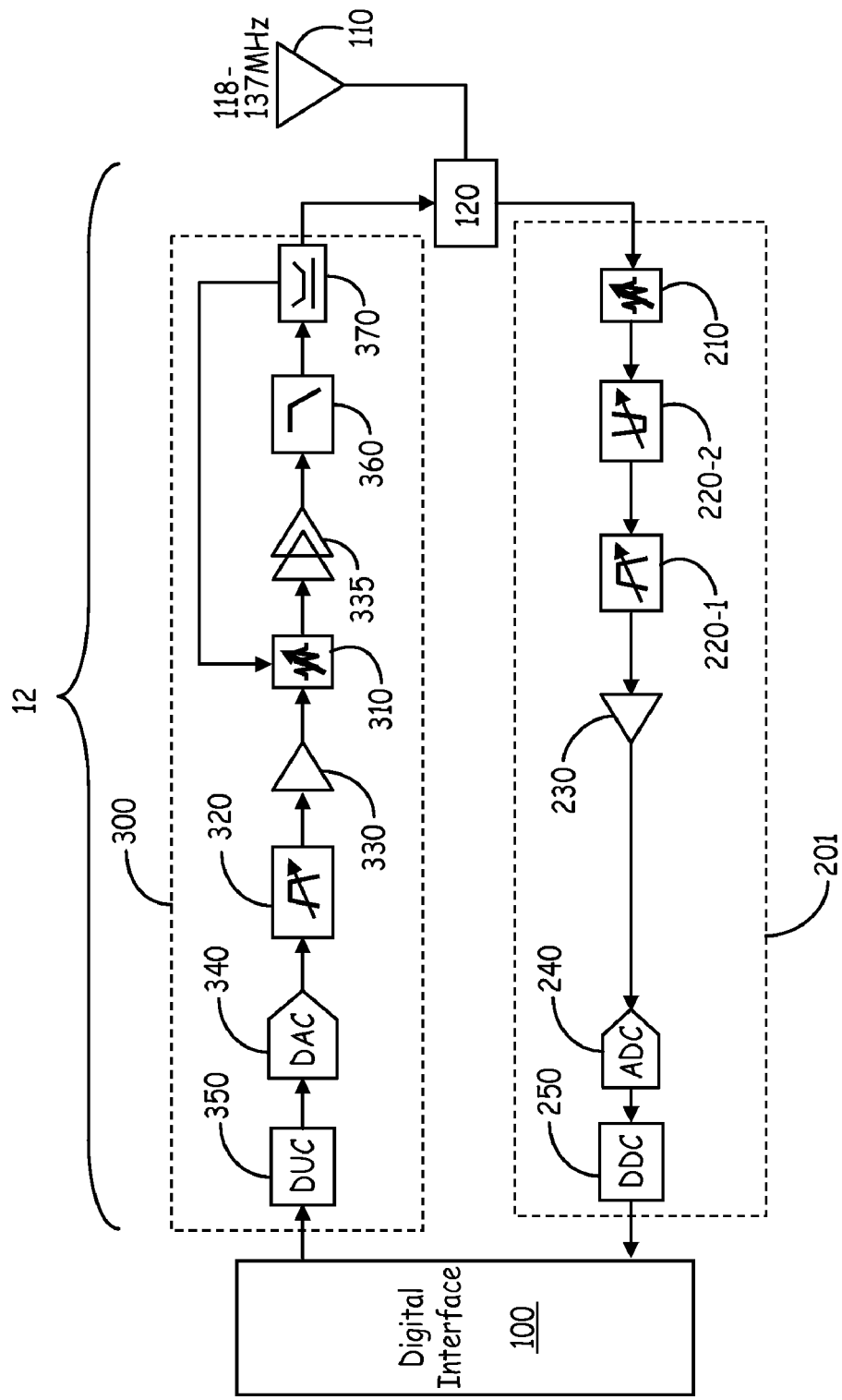

As shown in FIG. 7, the transceiver apparatus 12 includes the up-conversion path 300, which is the same as the up-conversion path 300 in FIG. 2, and a down-conversion path 201. The down-conversion path 201 differs from the down-conversion path 200 in FIG. 2, in that the configurable-MEMS-receive filter 220 in FIG. 2 is a first configurable-MEMS-transmit filter 220-1 in FIG. 7 and there is a second configurable-MEMS-receive filter 220-2 positioned between the power attenuator 210 and the first configurable-MEMS-transmit filter 220-1. The second configurable-MEMS-receive filter 220-2 is similar in structure and function to the embodiments of the configurable-MEMS-receive filter 220 described above with reference to FIG. 2. The transceiver apparatus 12 has the added advantage over the transceiver apparatus 10 in that there is additional filtering of the transmitted signals and/or strong off-channel interference in the receiver chain in the transceiver apparatus 12.

Figure 8:
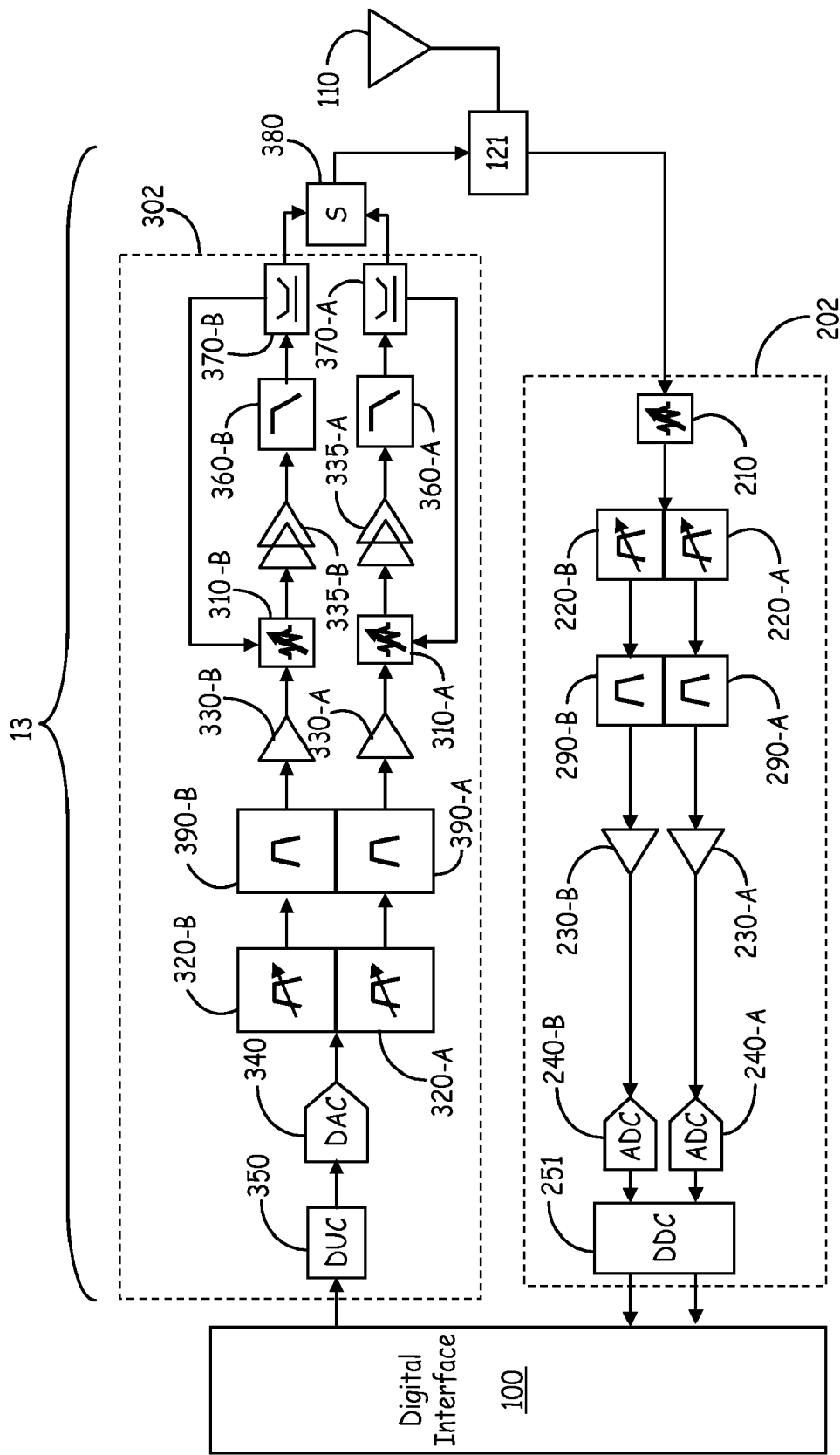

As shown in FIG. 8, the transceiver apparatus 13 includes the up-conversion path 302 and a down-conversion path 202 that are configured to extend the transceiver apparatus to multiple transmission and reception channels having parallel paths. The up-conversion path 302 includes two configurable-MEMS-transmit filters 320-A and 320-B and two non-MEMS receive filters 390-A and 390-B. The configurable-MEMS-transmit filters 320-A and 320-B are configured in parallel to each other. The configurable-MEMS-transmit filter 320-A is tunable to a first transmit frequency and the configurable-MEMS-transmit filter 320-B is tunable to a second transmit frequency, that is different from the first transmit frequency. In one implementation of this embodiment, the second transmit frequency is separate from (i.e., not immediately adjacent to or overlapping) the first transmit frequency. In another implementation of this embodiment, the second transmit frequency is adjacent to and/or overlapping the first transmit frequency.

The non-MEMS-transmit filters 390-A and 390-B are configured in parallel to each other. The non-MEMS-receive filter 390-A is set to the first transmit frequency (or a portion of the first transmit frequency) and the non-MEMS-receive filter 390-B is set to the second transmit frequency (or a portion of the second transmit frequency). The non-MEMS-transmit filter 390-A is configured in a serial relationship with the configurable-MEMS-transmit filter 320-A. The non-MEMS-transmit filter 390-B is configured in a serial relationship with the configurable-MEMS-receive filter 320-B.

The up-conversion path 302 also includes two amplifiers 330-A and 330-B, two power attenuators 310-A and 310-B, two power amplifiers 335-A and 335-B, two band pass filters 360-A and 360-B, and two couplers 370-A and 370-B, which are positioned between a respective output of the non-MEMS-transmit filters 390-A and 390-B and a summer 380.

The non-MEMS-transmit filter 390-A receives filtered signals from the configurable-MEMS-transmit filter 320-A and sends output signals to the amplifier 330-A. The amplifier 330-A sends output signals to the power attenuator 310-A. The power attenuator 310-A outputs signals to the power amplifier 335-A. The output from the power amplifier 335-A is sent to the low pass filter 360-A, which transmits filtered signals to the coupler 370-A. The coupler 370-A is communicatively coupled to provide feedback signals to the power attenuator 310-A. The coupler 370-A is also communicatively coupled to output signals to the summer 380.

The non-MEMS-transmit filter 390-B receives filtered signals from the configurable-MEMS-transmit filter 320-B and sends output signals to the amplifier 330-B. The amplifier 330-B sends output signals to the power attenuator 310-B. The power attenuator 310-B outputs signals to the power amplifier 335-B. The output from the power amplifier 335-B is sent to the low pass filter 360-B, which transmits filtered signals to the coupler 370-B. The coupler 370-B is communicatively coupled to provide feedback signals to the power attenuator 310-B. The coupler 370-B is also communicatively coupled to output signals to the summer 380. Thus, the portion of the up-conversion path 302 that includes the configurable-MEMS-transmit filter 320-A, non-MEMS-transmit filter 390-A, the power attenuator 310-A, the power amplifier 335-A, the low pass filter 360-A, and the coupler 370-A is parallel to the portion of the up-conversion path 302 that includes the configurable-MEMS-transmit filter 320-B, non-MEMS-transmit filter 390-B the power attenuator 310-B, the power amplifier 335-B, the low pass filter 360-B, and the coupler 370-B.

The summer 380 sums the signals output from the coupler 370-A with the signal output from the coupler 370-B. The summed signals are output from the summer 380 to the circulator 121. In one implementation of this embodiment, the circulator 121 is a transceiver switch 121.

In other implementations of this embodiment, there are three or more configurable-MEMS-transmit filters all configured in parallel to each other and each tunable to a different one of the transmit frequencies being transceived at the antenna 110. In this case, each of the three or more configurable-MEMS-transmit filters is included in a separate parallel portion of the down-conversion path 202. In exemplary implementations of this embodiment, the three or more transmit frequencies are adjacent to each other and/or overlapping each other. In another implementation of this embodiment, the non-MEMS-transmit filters 390-A and 390-B are not included in the up-conversion path 302.

As shown in FIG. 8, the down-conversion path 202 includes two configurable-MEMS-receive filters 220-A and 220-B and two non-MEMS receive filters 290-A and 290-B. The configurable-MEMS-receive filters 220-A and 220-B are configured in parallel to each other. The configurable-MEMS-receive filter 220-A is tunable to a first receive frequency and the configurable-MEMS-receive filter 220-B is tunable to a second receive frequency, that is different from the first receive frequency. The non-MEMS-receive filters 290-A and 290-B are configured in parallel to each other. The non-MEMS-receive filter 290-A is set to the first receive frequency (or a portion of the first receive frequency) and the non-MEMS-receive filter 290-B is set to the second receive frequency (or a portion of the second receive frequency). The non-MEMS-receive filter 290-A is configured in a serial relationship with the configurable-MEMS-receive filter 220-A. The non-MEMS-receive filter 290-B is configured in a serial relationship with the configurable-MEMS-receive filter 220-B.

The down-conversion path 202 also includes two amplifiers 230-A and 230-B, two analog-to-digital converters 240-A and 240-B, and a single digital down converter 251. As shown in FIG. 8, a power attenuator 210 is positioned to receive the signals from the circulator 120 and to output signals to the two configurable-MEMS-receive filters 220-A and 220-B.

The configurable-MEMS-receive filter 220-A is communicatively coupled to transmit signals at the first receive frequency that is received from the antenna 110 to the non-MEMS-receive filter 290-A. The non-MEMS-receive filter 290-A sends filtered signals to the amplifier 230-A. The amplified signal output from the amplifier 230-A is input to the analog-to-digital converter (ADC) 240-A. The analog-to-digital converter 240-A outputs signals to the communicatively coupled digital down-converter 251. The output side of the digital down-converter 251 is communicatively coupled to output signals to the digital interface 100.

The configurable-MEMS-receive filter 220-B is communicatively coupled to transmit signals at the second receive frequency that is received from the antenna 110 to the non-MEMS-receive filter 290-B. The non-MEMS-receive filter 290-B sends filtered signals to the amplifier 230-B. The amplified signal output from the amplifier 230-B is input to the analog-to-digital converter (ADC) 240-B. The analog-todigital converter 240-B outputs signals to the communicatively coupled digital down-converter 251. The output side of the digital down-converter 251 is communicatively coupled to output signals to the digital interface 100.

Thus, the portion of the down-conversion path 202 that includes the configurable-MEMS-receive filter 220-A, non-MEMS-receive filter 290-A, the amplifier 330-A, and analog-to-digital converter 240-A is parallel to the portion of the down-conversion path 202 that includes the configurable-MEMS-receive filter 220-B, non-MEMS-receive filter 290-B, the amplifier 330-B, and analog-to-digital converter 240-B. Each configurable-MEMS-receive filter 220-A and 220-B is tunable to a different one of receive frequencies. The receive frequencies differ from the transmit frequencies transceived at the antenna 110.

In other implementations of this embodiment, there are three or more configurable-MEMS-receive filters all configured in parallel to each other and each tunable to a different one of the receive frequencies being transceived at the antenna 110. In this case, each of the three or more configurable-MEMS-receive filters is included in a separate parallel portion of the down-conversion path 202. In exemplary implementations of this embodiment, the three or more receive frequencies are adjacent to each other and/or overlapping each other.

Figure 9:
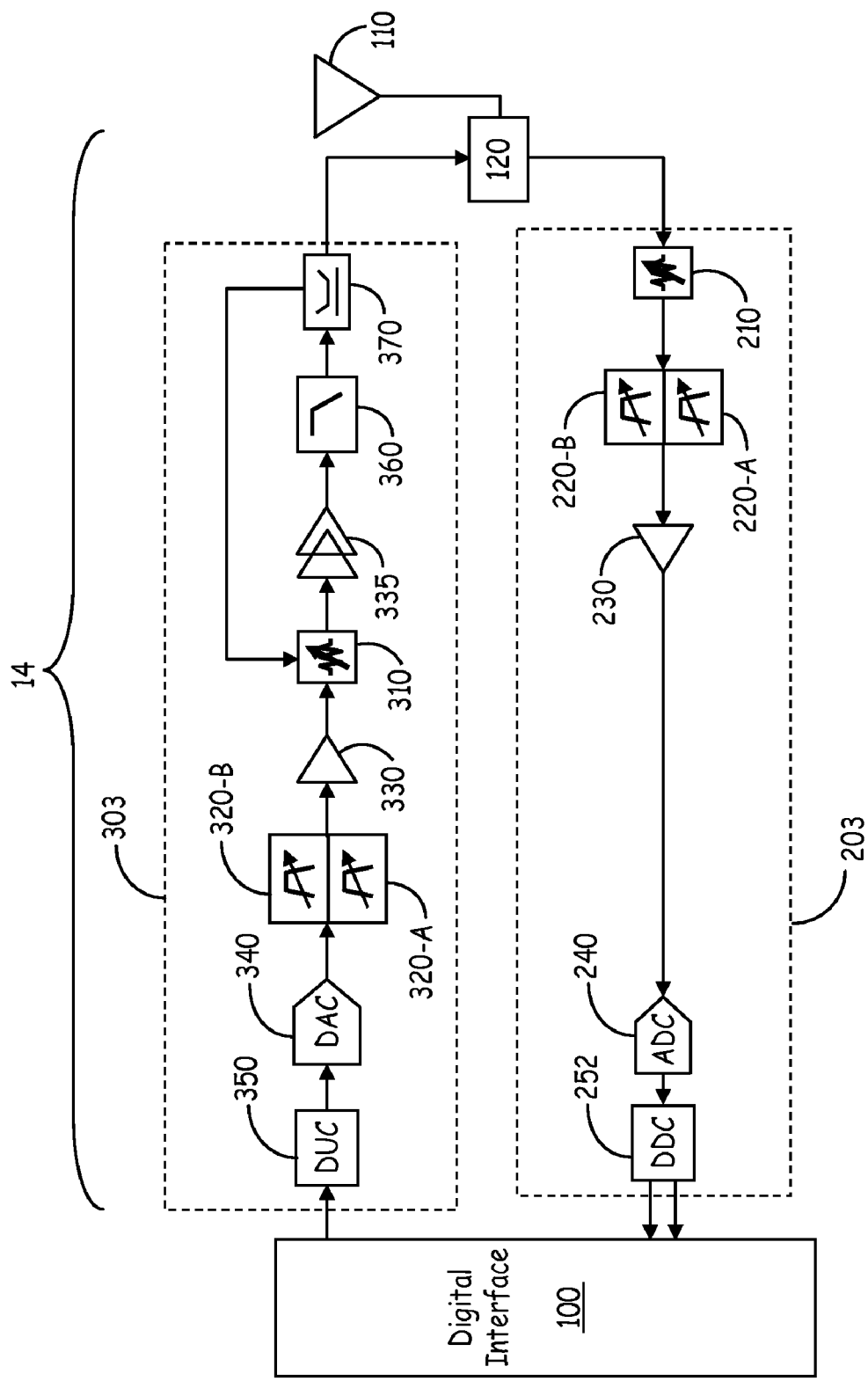

As shown in FIG. 9, the transceiver apparatus 14 includes the up-conversion path 303 and a down-conversion path 203 that are configured to extend channel transmission and reception using a multi-carrier transmitter and a wideband receiver. The up-conversion path 303 of FIG. 9 is similar in operation to the up-conversion path 300 of FIG. 2, but differs in that there are two configurable-MEMS-transmit filters 320-A and 320-B in the up-conversion path 303. The configurable-MEMS-transmit filters 320-A and 320-B are configured in parallel to each other. The configurable-MEMS-transmit filter 320-A is tunable to a first transmit frequency and the configurable-MEMS-transmit filter 320-B is tunable to a different second transmit frequency. In one implementation of this embodiment, the second transmit frequency is separate from (i.e., not immediately adjacent to or overlapping) the first transmit frequency. In another implementation of this embodiment, the second transmit frequency is adjacent to or overlapping the first transmit frequency. In other implementations of this embodiment, there are three or more configurable-MEMS-transmit filters all configured in parallel to each other and each tunable to a different one of the transmit frequencies being transceived at the antenna 110. In exemplary implementations of this embodiment, the three or more transmit frequencies are adjacent to each other and/or overlapping each other.

As in the up-conversion path 300 of FIG. 2, the up-conversion path 303 of FIG. 9 also includes one digital up-converter 350, one digital-to-analog converter 340, one amplifier 330, and a feedback loop that includes the power attenuator 310, the power amplifier 335, the low pass filter 360, and the coupler 370, which are positioned between a respective output of the configurable-MEMS-transmit filters 320-A and 320-B and the circulator 120.

The digital up-converter 350 is communicatively coupled to receive signals from the digital interface 100 and to output signals to the digital-to-analog converter 340. The digital-to-analog converter 340 is communicatively coupled to output signals to both of the configurable-MEMS-transmit filters 320-A and 320-B. The configurable-MEMS-transmit filters 320-A and 320-B output signals at two different transmit frequencies to the circulator 120 via the amplifier 330 and the components in the feedback loop of the up-conversion path 303. The circulator 120 outputs signals at the two different transmit frequencies received from the configurable-MEMS-transmit filters 320-A and 320-B to the antenna 110.

The amplifier 330 receives filtered signals at two different transmit frequencies from both of the configurable-MEMS-transmit filters 320-A and 320-B and sends output signals to the power attenuator 310. The power attenuator 310 outputs signals at two different transmit frequencies to the power amplifier 335. The output from the power amplifier 335 is sent to the low pass filter 360, which transmits filtered signals at two different transmit frequencies to the coupler 370.

The down-conversion path 203 includes two configurable-MEMS-receive filters 220-A and 220-B. The configurable-MEMS-receive filters 220-A and 220-B are configured in parallel to each other. The configurable-MEMS-receive filter 220-A is tunable to a first receive frequency and the configurable-MEMS-receive filter 220-B is tunable to a second receive frequency, that is different from the first receive frequency. In other implementations of this embodiment, there are three or more configurable-MEMS-receive filters all configured in parallel to each other and each tunable to a different one of the receive frequencies being transceived at the antenna 110.

The down-conversion path 203 includes an analog-to-digital converter 240, and a digital down-converter 252. The configurable-MEMS-receive filters 220-A and 220-B are communicatively coupled to transmit signals received from the antenna 110 to the amplifier 230. The amplified signal for the two receive frequencies is sent to the analog-to-digital converter (ADC) 240 from the amplifier 230. The analog-to-digital converter (ADC) 240 outputs signals to the communicatively coupled digital down-converter 252. The output side of the digital down-converter 252 is communicatively coupled to output signals for the first receive frequency and the second receive frequency to the digital interface 100. As shown in FIG. 9, a power attenuator 210 is positioned to receive the signals from the circulator 120 and to output first frequency receive signals and second frequency receive signals to the respective configurable-MEMS-filters 220-A and 220-B.

Figure 10:
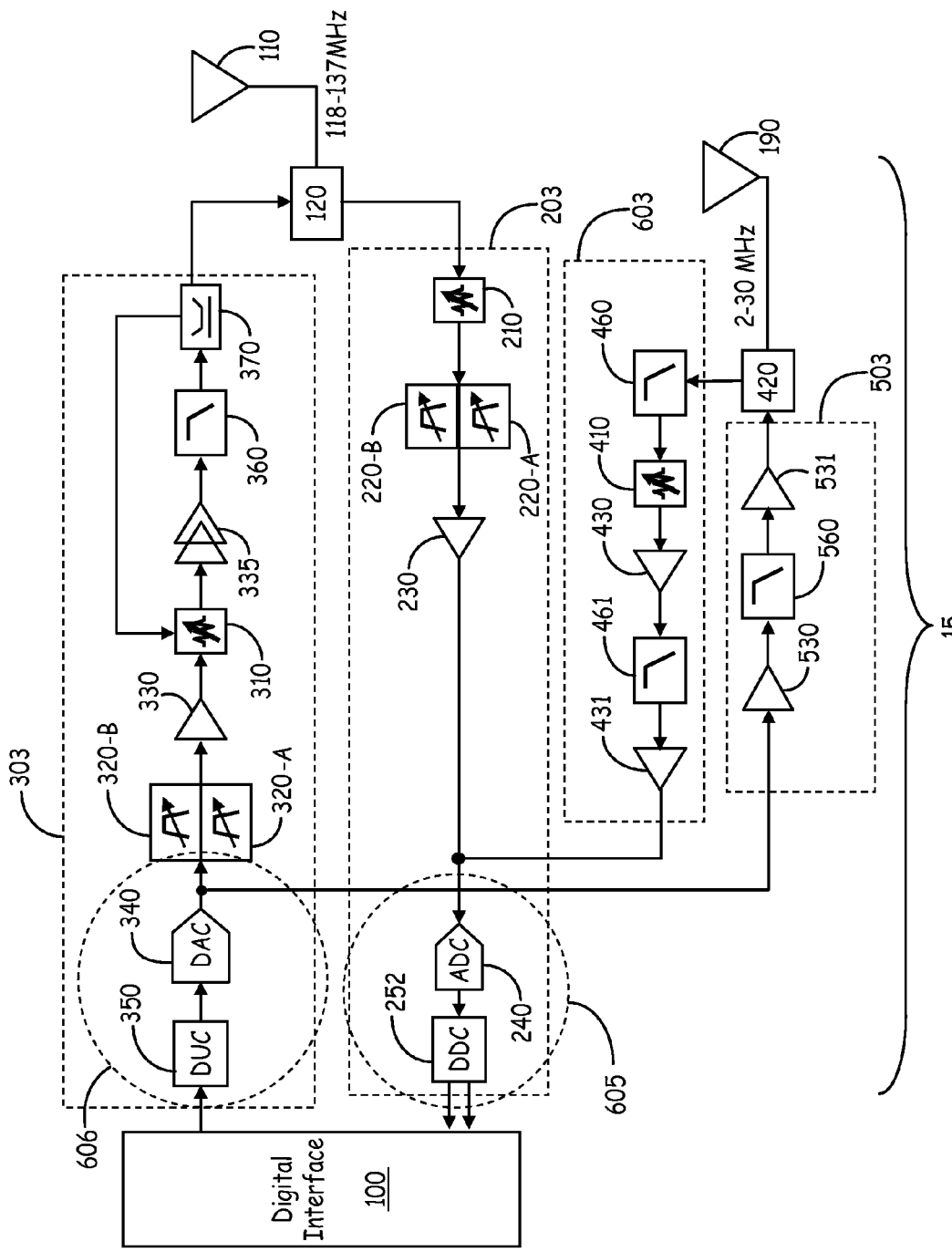

As shown in FIG. 10, the transceiver apparatus 15 includes the up-conversion path 303 and a down-conversion path 203, that are integrated with a second transceiver system. This configuration allows two up-conversion paths and two down-conversion paths to share a portion of their paths. The second transceiver system includes an up-conversion path 503 and a down-conversion path 603 that are communicatively coupled to a second antenna 190 via one of a circulator 420 or a transceiver switch 420. The second antenna 190 tranceives at a different frequency range than the antenna 110 (also referred to herein as first antenna 110). In one implementation of this embodiment, the first antenna 110 transceives signals in a very high frequency (VHF) communication system while the second antenna 190 transceives signals in a high frequency (HF) communication system.

The up-conversion path 303 and the down-conversion path 203 are configured as described above with reference to FIG. 9. The up-conversion path 503 includes a first amplifier 530, a band pass filter 560 and a second amplifier 531. In one implementation of this embodiment, the up-conversion path 503 also includes a MEMS filter. The first amplifier 530 outputs signals to the band pass filter 560, which outputs signals to the second amplifier 531. The output from the digital-to-analog converter 340 in the up-conversion path 303 is tapped to the input of the first amplifier 530 in the up-conversion path 503. Thus, the portion 606 of the up-conversion path 303, which includes the digital up-converter 350 and the digital-to-analog converter 340, is shared with the up-conversion path 503.

The down-conversion path 603 includes a first low pass filter 460, a power attenuator 410, a first amplifier 430, a second band pass filter 461, and a second amplifier 431. In one implementation of this embodiment, the down-conversion path 603 also includes a MEMS filter. The circulator 420 or transceiver switch 420 sends signals received at the second antenna 190 to the first low pass filter 460. The output from the first low pass filter 460 is sent to the power attenuator 410. The output from the power attenuator 410 is sent to the first amplifier 430. The output from the first amplifier 430 is sent to the second band pass filter 461. The output from the band pass filter 461 is sent to the second amplifier 431. The output from the second amplifier 431 is sent to the input end of the analog-to-digital converter 240 in the down-conversion path 203. Thus, the portion 605 of the down-conversion path 203, which includes analog-to-digital converter 240 and the digital down-converter 252, is shared with the down-conversion path 603.

Figure 11:
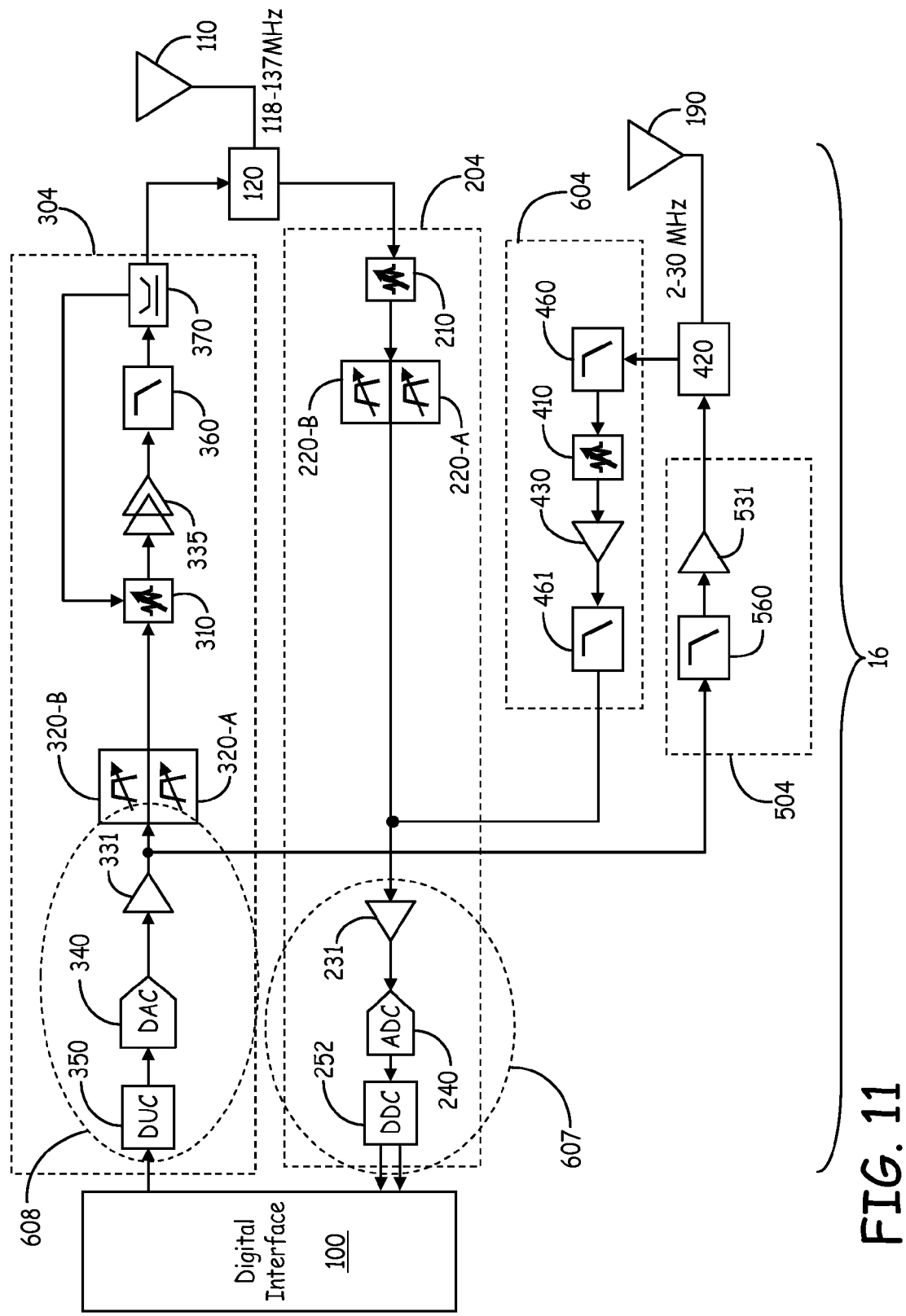

As shown in FIG. 11, the transceiver apparatus 16 includes the up-conversion path 304 and a down-conversion path 204, that are integrated with a second transceiver system. This configuration allows two up-conversion paths and two down-conversion paths to share a portion of their paths, however the shared portions differ from the shared portions 605 and 606 in the transceiver apparatus 15 described above with reference to FIG. 10.

In the transceiver apparatus 16, the portion 608 of the up-conversion path 304 that is shared with the up-conversion path 504 includes the amplifier 331 that sends amplified signals to the band pass filter 560 in the up-conversion path 504 and sends amplified signals to the two configurable-MEMS-transmit filters 320-A and 320-B in up-conversion path 304. The amplifier 330 in the up-conversion path 303 of FIG. 10 is replaced by the amplifier 331 in portion 608 of FIG. 11. The amplifier 530 in the up-conversion path 503 of FIG. 10 is replaced by the amplifier 331 in portion 608.

In the transceiver apparatus 16, the portion 607 of the down-conversion path 204 that is shared with the down-conversion path 604 includes the amplifier 231 that sends amplified signals to the analog-to-digital converter 240 from the band pass filter 461 in the down-conversion path 604. The amplifier 231 also sends amplified signals from the two configurable-MEMS-receive filters 220-A and 220-B to the analog-to-digital converter 240. The amplifier 230 in the down-conversion path 203 of FIG. 10 is replaced by the amplifier 231 in portion 607 of FIG. 11. Likewise, the amplifier 431 in the down-conversion path 603 of FIG. 10 is replaced by the amplifier 231 in portion 607. Thus, the transceiver apparatus 16 has fewer components (i.e., fewer amplifiers) that the transceiver apparatus 15 of FIG. 10.

Figure 12:
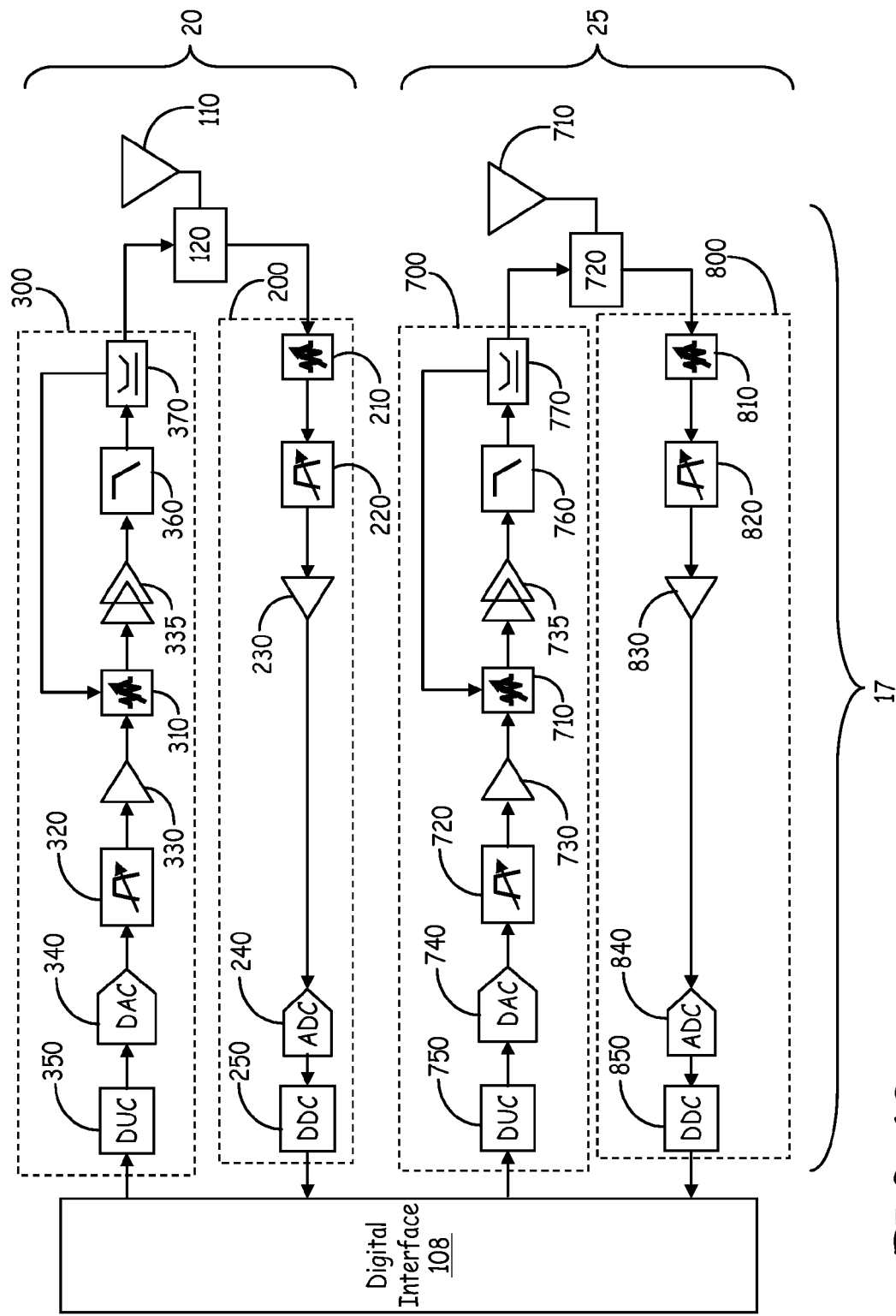

As shown in FIG. 12, a transceiver system 17 includes a plurality of transceiver apparatuses represented generally at 20 and 25 that are communicatively coupled to the same digital interface 108. The transceiver apparatuses 20 and 25 are isolated from each other by the configurable-MEMS-receive filters 220 and 820 and the configurable-MEMS-transmit filters 320 and 720 within the respective transceiver apparatuses 20 and 25. The transceiver apparatuses 20 and 25 each operate within a different frequency range.

The transceiver apparatus 20 includes the up-conversion path 300, the down-conversion path 200, and the circulator 120. In one implementation of this embodiment, the transceiver apparatus 20 includes the up-conversion path 300, the down-conversion path 200, the circulator 120, and the antenna 110.

The transceiver apparatus 25 includes the up-conversion path 700, the down-conversion path 800, and the one of a circulator 720 or a transceiver switch 720. In one implementation of this embodiment, the transceiver apparatus 25 includes the up-conversion path 700, the down-conversion path 800, the circulator 720 or transceiver switch 720, and the antenna 710.

Each antenna 110 and 710 transmits signals at a unique transmit frequency, and receives signals at a unique receive frequency. The transmit frequencies differ from the receive frequencies. The at least one configurable-MEMS-transmit filters (such as configurable-MEMS-transmit filters 320 and 720), prevent interference on the up-conversion paths 300 and 700 from signals transmitted at any of the antennae 110 and 710. The configurable-MEMS-receive filters 220 and 820 prevent interference on the down-conversion paths 200 and 800 from signals received at any of the antennae 110 and 710.

The up-conversion paths 300 and 700 are the same in structure and function as the up-conversion path 300 of the transceiver apparatus 10 described above with reference to FIG. 2. The down-conversion paths 200 and 800 are the same in structure and function as the down-conversion path 200 of the transceiver apparatus 10 described above with reference to FIG. 2. The transceiver apparatuses 20 and 25 function the same as the transceiver apparatus 10 that includes the circulator 120, the up-conversion path 300 and the down-conversion path 200 of FIG. 2 and that is communicatively coupled to the antenna 110.

In other implementations of this embodiment, the up-conversion paths 300 and 700 and the down-conversion paths 200 and 800 can be similar in structure and function to the up-conversion paths and down-conversion paths of the transceiver apparatuses 11-16 as described with reference to the FIGS. 6-11, respectively. In other implementations of this embodiment, the transceiver system 17 includes three or more transceiver apparatuses that are similar in structure and function to the transceiver apparatuses 10, 11, 12, 13,14, 15, and/or 16 as described with reference to the FIGS. 2, 5, 6, 7, 8, 9, and/or 10, respectively.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

We claim:

1. A transceiver apparatus comprising a software-definable-radio-transceiver architecture, the transceiver apparatus comprising:
an up-conversion path including at least one configurable micro-electro-mechanical-system (MEMS) transmit filter communicatively coupled to transmit output from a digital-to-analog converter to an antenna; and
a down-conversion path including at least one configurable-MEMS-receive filter communicatively coupled to transmit signals received from the antenna to an analog-to-digital converter;
wherein the at least one configurable-MEMS-transmit filter prevents interference on the up-conversion path from signals transmitted from the antenna, and wherein the at least one configurable-MEMS-receive filter prevents interference on the down-conversion path from signals received by the antenna.

2. The transceiver apparatus of claim 1, wherein the at least one configurable-MEMS-transmit filter comprises at least one switched bank of MEMS filters adjustable to a transmit frequency.

3. The transceiver apparatus of claim 2, wherein the at least one configurable-MEMS-receive filter comprises at least one switched bank of MEMS filters adjustable to a receive frequency, wherein the receive frequency differs from the transmit frequency.

4. The transceiver apparatus of claim 1, wherein the at least one configurable-MEMS-receive filter comprises at least one switched bank of MEMS filters adjustable to a receive frequency.

5. The transceiver apparatus of claim 1, wherein the at least one configurable-MEMS-transmit filter comprises at least one tunable MEMS filter tunable to a transmit frequency.

6. The transceiver apparatus of claim 5, wherein the at least one configurable-MEMS-receive filter comprises at least one tunable MEMS filter tunable to a receive frequency, wherein the receive frequency differs from the transmit frequency.

7. The transceiver apparatus of claim 1, wherein the at least one configurable-MEMS-receive filter comprises at least one tunable MEMS noth filter tunable to a receive frequency.

8. The transceiver apparatus of claim 1, wherein the at least one configurable-MEMS-transmit filter comprises a plurality of configurable-MEMS-transmit filters configured in parallel to each other, each configurable-MEMS-transmit filter tunable to a different one of transmit frequencies.

9. The transceiver apparatus of claim 8, wherein the at least one configurable-MEMS-receive filter comprises a plurality of configurable-MEMS-receive filters configured in parallel to each other, each configurable-MEMS-receive filter tunable to a different one of receive frequencies, wherein the receive frequencies differ from the transmit frequencies.

10. The transceiver apparatus of claim 1, wherein the at least one configurable-MEMS-receive filter comprises a plurality of configurable-MEMS-receive filters configured in parallel to each other, each configurable-MEMS-receive filter tunable to a different one of receive frequencies.

11. The transceiver apparatus of claim 1, further comprising at least one of a non-MEMS-receive filter in the down-conversion path, the non-MEMS-receive filter tuned to a receive frequency for the communicatively coupled antenna.

12. The transceiver apparatus of claim 11, further comprising a non-MEMS-transmit filter in the up-conversion path, the non-MEMS-transmit filter tuned to a transmit frequency for the communicatively coupled antenna, wherein the receive frequency differs from the transmit frequency.

13. The transceiver apparatus of claim 1, further comprising at least one of a non-MEMS-receive filter in the down-conversion path, the non-MEMS-receive filter tuned to a receive frequency for the communicatively coupled antenna.

14. The transceiver apparatus of claim 1, wherein the up-conversion path is a first up-conversion path, the down-conversion path is a first down-conversion path, and the antenna is a first antenna, the transceiver apparatus further comprising:
a second up-conversion path communicatively coupled to transmit output from the digital-to-analog converter to a second antenna; and
a second down-conversion path communicatively coupled to transmit signals received from the second antenna to the analog-to-digital converter in the first down-conversion path, wherein the at least one configurable-MEMS-transmit filter prevents interference on the first up-conversion path from signals received at the second antenna,
wherein the at least one configurable-MEMS-receive filter prevents interference on the first down-conversion path from signals transmitted at the second antenna,
wherein the first and second down-conversion path share a common analog-to-digital converter, and
wherein the first and second up-conversion path share a common digital-to-analog converter.

15. The transceiver apparatus of claim 14, wherein the first and second down-conversion paths share a common amplifier and wherein the first and second up-conversion path share a common amplifier.

16. The transceiver apparatus of claim 1, wherein the up-conversion path further includes:
a digital up-converter, and
a digital-to-analog converter communicatively coupled to transmit output from the digital up-converter to the at least one configurable-MEMS-transmit filter, wherein output from the configurable-MEMS-transmit filter is sent to the antenna via a circulator or a transceiver switch, and wherein the down-conversion path further includes:
an analog-to-digital converter communicatively coupled to receive output from the configurable-MEMS-receive filter, and
a digital down-converter communicatively coupled to receive output from the analog-to-digital converter, wherein the input to the configurable-MEMS-receive filter is received from the antenna via the circulator or the transceiver switch.

17. A transceiver system, comprising:
a plurality of transceiver apparatuses, each transceiver apparatus including:
an up-conversion path including at least one configurable micro-electro-mechanical-system (MEMS) transmit filter communicatively coupled to transmit output from a digital-to-analog converter to one of a plurality of antennae; and
a down-conversion path including at least one configurable-MEMS-receive filter communicatively coupled to transmit signals received from the one of the plurality of antennae to an analog-to-digital converter,
wherein each antenna in the plurality of antennae transmits signals at a unique transmit frequency, and receives signals at a unique receive frequency, wherein the transmit frequencies differ from the receive frequencies,
wherein the plurality of at least one configurable-MEMS-transmit filters prevent interference on the plurality of up-conversion paths from signals transceived at any of the plurality of antennae, and
wherein the plurality of at least one configurable-MEMS-receive filters prevent interference on the plurality of down-conversion paths from signals transceived at any of the plurality of antennae.

18. The transceiver system of claim 17, wherein the at least one configurable-MEMS-transmit filter in the plurality of up-conversion paths comprises one of a switched bank of MEMS filters tunable to the transmit frequency for the communicatively coupled antenna, and a tunable MEMS notch filter tunable to the transmit frequency for the communicatively coupled antenna, and combinations thereof, and
wherein the at least one configurable-MEMS-receive filter in the plurality of down-conversion paths comprises one of, a switched bank of MEMS filters tunable to the receive frequency for the communicatively coupled antenna, a tunable MEMS notch filter tunable to the receive frequency for the communicatively coupled antenna, and combinations thereof.

19. A transceiver apparatus comprising a software-definable-radio-transceiver architecture, the transceiver apparatus comprising:
an up-conversion path including at least one configurable micro-electro-mechanical-system (MEMS) transmit filter communicatively coupled to transmit signals output from a digital-to-analog converter at a transmit frequency to an antenna; and
a down-conversion path including at least one configurable-MEMS-receive filter communicatively coupled to transmit signals received from the antenna at a receive frequency to an analog-to-digital converter, wherein the at least one configurable-MEMS-transmit filter prevents interference on the up-conversion path from signals at the receive frequency, and wherein the at least one configurable-MEMS-receive filter prevents interference on the down-conversion path from signals at the transmit frequency,
wherein the at least one configurable-MEMS-transmit filter comprises one of a switched bank of MEMS filters adjustable to the transmit frequency, a tunable MEMS notch filter tunable to the transmit frequency, and combinations thereof, and
wherein the at least one configurable-MEMS-receive filter comprises one of a switched bank of MEMS filters adjustable to the receive frequency, a tunable MEMS notch filter tunable to the receive frequency, and combinations thereof, wherein the receive frequency differs from the transmit frequency.

20. The transceiver apparatus of claim 19, further comprising:
a circulator communicatively coupled to the up-conversion path and the down-conversion path; and
the antenna communicatively coupled to the circulator, wherein the up-conversion path further includes,
a digital up-converter, and
a digital-to-analog converter communicatively coupled to transmit output from the digital up-converter to the at least one configurable-MEMS-transmit filter, wherein output from the configurable-MEMS-transmit filter is sent to the antenna via the circulator, and wherein the down-conversion path further includes,
an analog-to-digital converter communicatively coupled receive output from the configurable-MEMS-receive filter, and
a digital down-converter communicatively coupled to receive output from the analog-to-digital converter, wherein the input to the configurable-MEMS-receive filter is received from the antenna via the circulator.

* * * * *

UNITED STATES PATENT AND TRADEMARK OFFICE
CERTIFICATE OF CORRECTION

PATENT NO. : 7,945,229 B2  
APPLICATION NO. : 12/036083  
DATED : May 17, 2011  
INVENTOR(S) : Wilson et al.

Page 1 of 1

It is certified that error appears in the above-identified patent and that said Letters Patent is hereby corrected as shown below:

In the Claims

Claim 18, Column 14, Line 63, replace "tunable to the transit frequency" with --tunable to the receive frequency--.

Claim 18, Column 15, Line 3, replace "receive frequency" with --transmit frequency--.

Claim 19, Column 15, Line 26, replace "notch filter tunable to the transmit frequency" with --notch filter tunable to the receive frequency--.

Claim 19, Column 16, Line 4, replace "notch filter tunable to the receive frequency" with --notch filter tunable to the transmit frequency--.

Signed and Sealed this  
Eighth Day of April, 2014

Michelle K. Lee  
*Deputy Director of the United States Patent and Trademark Office*